United States Patent [19]
Smothers

[11] Patent Number: 5,842,651
[45] Date of Patent: Dec. 1, 1998

[54] VEGETATION SHREDDER AND METHOD OF USING SAME

[76] Inventor: Ed Smothers, 1900 N. 2nd Ave. E., Newton, Iowa 50208

[21] Appl. No.: 923,358

[22] Filed: Sep. 4, 1997

[51] Int. Cl.⁶ .................................................... B02C 19/12
[52] U.S. Cl. .......................... 241/27; 241/100; 241/102; 241/169.1; 241/199.12
[58] Field of Search .............................. 241/100, 101.78, 241/102, 169.1, 199.12, 27

[56] References Cited

U.S. PATENT DOCUMENTS

| | | |
|---|---|---|
| 2,592,481 | 4/1952 | Spencer et al. ..................... 241/102 X |
| 3,761,026 | 9/1973 | Rohmer .............................. 241/199.12 |
| 3,895,440 | 7/1975 | Pittinger, Jr. . |
| 3,977,078 | 8/1976 | Pittinger, Jr. . |
| 4,068,377 | 1/1978 | Kimmel et al. . |
| 4,187,598 | 2/1980 | Pittinger, Jr. . |
| 4,202,094 | 5/1980 | Kalmar . |
| 4,209,135 | 6/1980 | Starks .................................. 241/46.17 |
| 4,238,866 | 12/1980 | Taylor . |
| 4,317,282 | 3/1982 | Pace . |
| 4,682,740 | 7/1987 | Conigliaro et al. .................. 241/282.1 |
| 4,756,146 | 7/1988 | Rouse . |
| 4,905,465 | 3/1990 | Jones et al. . |
| 5,360,170 | 11/1994 | Cartellone ............................ 241/169.1 |
| 5,580,007 | 12/1996 | Caviezel et al. ................... 241/199.12 |
| 5,660,338 | 8/1997 | Emmerson ............................. 241/37.5 |

FOREIGN PATENT DOCUMENTS 2000672  1/1979  European Pat. Off. .

Primary Examiner—John M. Husar
Attorney, Agent, or Firm—Zarley, McKee, Thomte, Voorhees & Sease

[57] ABSTRACT

A vegetation shredder includes an elongated shaft to which a Frisbee-like disk element is attached downwardly facing and extending over a fastening collar to which elongated shredding tie elements are fastened around the periphery. The disk includes a downwardly extending peripheral rim which assists in creating a vacuum chamber between the disk and the shredding elements into which leaves are drawn.

10 Claims, 2 Drawing Sheets

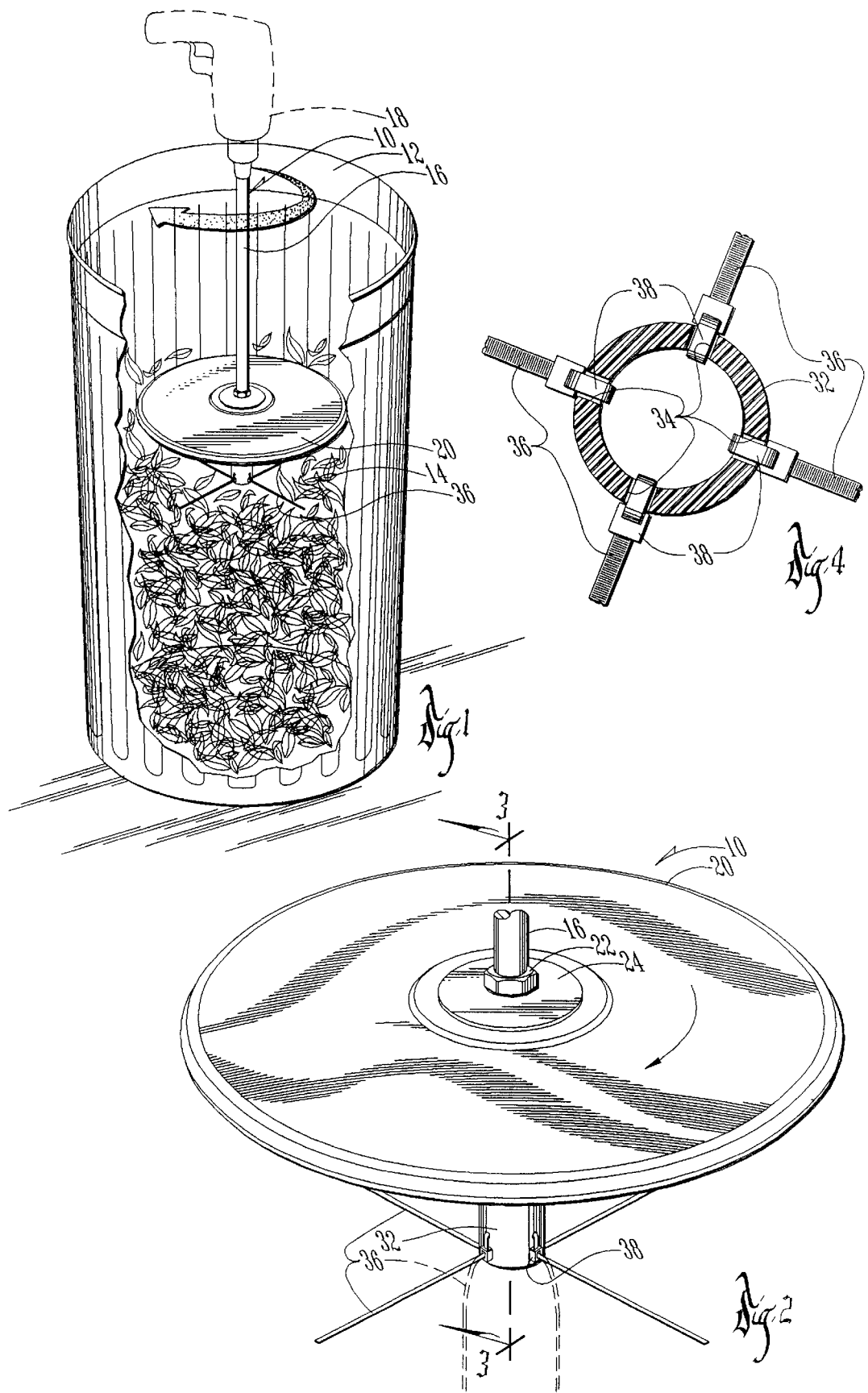

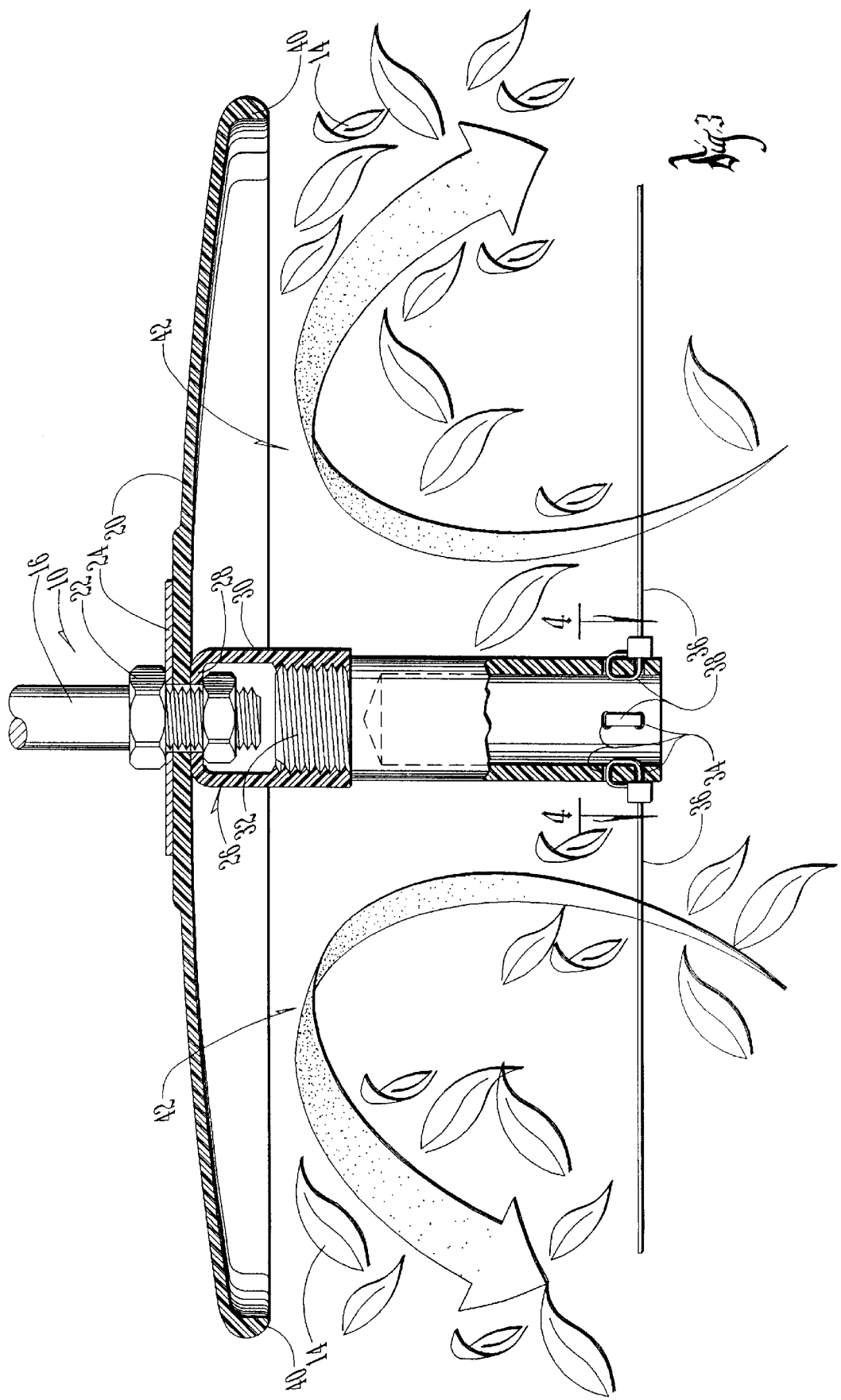

VEGETATION SHREDDER AND METHOD OF USING SAME

BACKGROUND OF THE INVENTION

This invention relates to a tool for use in the yard for shredding leaf-like vegetation such as leaves so that they may be recycled by being spread on the ground.

Equipment presently available for shredding leaves is highly mechanized and expensive and may involve a rotary power mower or a powered piece of equipment dedicated solely to leaf shredding. What is needed is a simple inexpensive leaf shredder for the average smaller leaf shredding jobs which are typical for most residential yards.

SUMMARY OF THE INVENTION

Use of the leaf shredder of this invention first involves placing the leaves in a container such as a garbage can and the shredder operated by a conventional electric drill is reciprocated up and down in the can and quickly and effectively shreds the leaves which are confined between the bottom and side walls of the can and the shredder.

The shredder involves an elongated shaft on which a disk element is mounted for rotation and substantially therebelow a collar is affixed to the lower end of the shaft for securing elongated elements spaced around the periphery which perform the shredding action. The disk-like element has a number of functions including preventing the leaves from being thrown upwardly into the face of the operator and preventing the elongated elements from hitting the side walls of the can. The disk also helps to contain dust created by the shredding operation from rising into the face of the operator and damaging the electric drill.

Perhaps the most important function of the disk and the relationship of the elongated shredding elements therebelow is to create a vacuum chamber between the disk and the shredding elements such that leaves are drawn into the chamber for more effective shredding and the shredder is assisted in its downward motion into the leaves by being drawn downwardly.

The creation of a vacuum chamber is further created by a downwardly extending peripheral rim on the disk which helps to define the limits of the vacuum chamber and retain material being shredded within that chamber. It has also been found that rotation of the disk further assists in performing a successful shredding operation.

The elongated shredding elements are readily available in local hardware stores as cable ties are used. The ties include a loop at one end allowing the elongated element to be threaded through openings in the periphery of the collar and then anchored to the collar by the free end of the tie extending through the loop on the tie. Should a tie break or need to be replaced, this is easily inexpensively accomplished.

The shredding ties may be connected to the collar to extend through a range of positions from downwardly to horizontally outwardly.

BRIEF DESCRIPTION OF THE DRAWINGS

FIG. 1 is a fragmentary perspective view of the vegetation shredder of this invention being operated in a container having leaves.

FIG. 2 is a fragmentary perspective view of the shredder assembly including the disk, collar and elongated shredding elements.

FIG. 3 is a cross-sectional view taken along line 3—3 in FIG. 2 showing how the shredder assembly components are assembled.

FIG. 4 is a cross-sectional view taken along line 4—4 in FIG. 3 illustrating the fastening of the elongated shredding tie elements to the collar fastening means.

DETAILED DESCRIPTION OF THE INVENTION

The vegetation shredder of this invention is referred to generally in FIG. 1 by the Reference 10 and is shown in a garbage-type can 12 operated to shred leaf-like vegetation 14. While a garbage-type container 12 is shown, a conventional garbage bag may be used and the disk 20 will guard against the shredding elements 36 tearing the side walls of the bag.

The shredder 10 includes an elongated shaft 16 to which a conventional electric drill 18 is connected at the shaft's upper end. The lower end of the shaft 16 includes a horizontally disposed disk 20 locked on the shaft by a pair of nuts 22. The disk may be made of any suitable material but is preferably made from plastic. The upper nut 22 engages a washer 24 which bears against the topside of the disk 20.

A fastening collar 26 houses the lower nut 22 to apply pressure against the top wall 28 of the collar which in turn bears against the bottom surface of the disk 20. The shaft 16 includes threads 30.

The lower end of the collar includes an extension collar element 32 threaded into the collar 26. The extension collar element 32 is open on its interior and includes a plurality of pairs of openings 34 closely adjacent to lower free end to receive elongated shredding tie elements 36 threaded therethrough.

The tie elements 36 are commonly sold in hardware stores as cable ties and include a loop 38 through which the free end of the elements 36 are threaded after having been threaded through the openings 34. This locks the tie elements to the extension collar element 32.

It is seen by the dash line representation in FIG. 2 that the elongated tie elements 36 can be secured to the extension collar element 32 to be positioned between a range of positions from downwardly extending to horizontally extending as represented by the dash and solid lines respectively in FIG. 2.

Disk 20 has the shape of a yard toy referred to as a Frisbee and includes a downwardly extending peripheral rim 40.

It is seen in operation that the spacing of the shred tie elements 36 from the disk 20 functions to create a vacuum chamber 42 therebetween which draws leaves 14 therein and assists in reducing the resistance to downward movement of the shredder allowing for ease of vertical reciprocation in the leaves. The rim 40 further functions to define the vacuum chamber and confine the leaves and dust therein. The outer periphery of the disk is positioned outwardly of the outer ends of the shredding elements 36 thus assuring that the shredding elements do not engage the side walls of the container 14 thereby avoiding unnecessary wear on the shredding elements 36. It is believed that the rotation of the disk element 20 with the shaft 16 and shredding elements 36 maximizes the vacuum creation function.

As shredding ties 36 break or wear down, they can be readily replaced. The distance between the disk 20 and the shredding ties 36 may vary but is preferably 4½ inches. The speed of the drill may vary but is preferably operated at full speed.

What is claimed is:

1. A hand-held leaf-like vegetation shredder comprising, an elongated shaft having upper and lower ends, said upper end adapted to engage a power means for rotating said shaft, said lower end being a free end allowing said shredder to be freely moved about in a container containing vegetation, a disk mounted on said shaft intermediate said upper and lower ends, a fastening means mounted on said shaft between said lower end and said disk and spaced downwardly from said disk, and a plurality of elongated elements connected to said fastening means around its periphery in spaced apart relationship whereby said elongated elements when rotated and their spacing from said disk create a vacuum chamber therebetween for drawing vegetation therein.

2. The hand-held leaf-like vegetation shredder of claim 1 wherein said mounting of said disk to said shaft allows for said disk to rotate with said shaft.

3. The hand-held leaf like vegetation shredder of claim 1 wherein said disk has a size and shape such that said elongated elements are substantially disposed thereunder.

4. The hand-held leaf-like vegetation shredder of claim 3 wherein said disk has an outer peripheral edge which includes a downwardly extending rim which further assists in the creation of said vacuum chamber for drawing said shredder into the leaf-like vegetation in a container.

5. The hand-held leaf-like vegetation shredder of claim 1 wherein each of said elongated elements include a loop at one end opposite a free end, said fastening means having openings through which said elongated elements extend with said free ends then extending through said loops.

6. The hand-held leaf-like vegetation shredder of claim 1 wherein said fastening means is a collar having a downwardly extending cylindrical wall including spaced apart openings around its periphery through which said elongated elements extend for their connection to said fastening means.

7. The hand-held leaf-like vegetation shredder of claim 6 wherein said openings are positioned closely adjacent the lower end of said collar for said elongated elements to be selectively positioned between downwardly extending to horizontally outwardly extending.

8. The hand-held leaf-like vegetation shredder of claim 7 wherein said elongated elements are flexible and made of plastic.

9. A method of shredding leaf-like vegetation comprising the steps of, providing a container having an open upper end and containing leaf-like vegetation, providing a hand-held shredder comprising, a shaft having an upper end and lower free end, a power means for rotating said shaft connected to said upper end, a fastening means connected to said lower end and having a plurality of elongated elements connected thereto along its periphery in spaced apart relationship, a disk mounted on said shaft for rotation therewith above and in spaced relationship to said elongated elements with said disk being of such a size that it substantially extends over said elongated elements, and operating said power means to rotate said shredder and reciprocating said shredder longitudinally of said container in said leafy vegetation.

10. The method of shredding leaf-like vegetation of claim 9 wherein the step of providing a shredder further includes providing a downwardly extending rim along its outer peripheral edge which functions when said elongated elements are rotated to create a vacuum chamber below said disk in said container to draw vegetation therein and said shredder into said leaf-like vegetation for more effective shredding of said vegetation.

* * * * *